United States Patent [19]

Paetzel et al.

[11] 3,784,156

[45] Jan. 8, 1974

[54] VALVE

[75] Inventors: Herbert Paetzel; Horst Pfeiffer, both of Oedt-Mulhausen, Germany

[73] Assignee: Masoneilan International, Inc., Norwood, Mass.

[22] Filed: Feb. 23, 1972

[21] Appl. No.: 228,567

[30] Foreign Application Priority Data

Feb. 25, 1971 Germany................. P 21 09 217.1

[52] U.S. Cl................... 251/250, 251/340, 137/219

[51] Int. Cl........................................... F16k 31/53

[58] Field of Search.................... 251/250, 340, 248, 251/335 B, 333; 137/219

[56] References Cited

UNITED STATES PATENTS

| | | | |
|---|---|---|---|
| 2,240,119 | 4/1941 | Montgomery et al. | 251/250 X |
| 2,841,178 | 7/1958 | Schultz | 251/250 X |
| 3,123,096 | 3/1964 | Notaro et al. | 251/368 X |
| 3,159,377 | 12/1964 | Samour | 251/368 X |
| 3,188,048 | 6/1965 | Sutherland | 251/368 X |
| 3,251,575 | 5/1966 | Campbell et al. | 251/368 X |
| 3,503,415 | 3/1970 | DeAngelis et al. | 251/368 X |

FOREIGN PATENTS OR APPLICATIONS

| | | | |
|---|---|---|---|
| 551,475 | 2/1943 | Great Britain | 137/219 |

*Primary Examiner*—Martin P. Schwadron
*Assistant Examiner*—David R. Matthews
*Attorney*—Price, Heneveld, Huizenga & Cooper

[57] ABSTRACT

Corrosive fluid valve having a fixed valve plug and a shiftable valve seat ring. A fluid passage liner comprising flexible bellows endwise-engaging the seat ring, and which liner seals the valve end-to-end without any inside sealing points. A valve actuator engaging the seat ring to open and close the valve from outside the valve passage, and sealed off by the liner from exposure to the corrosive fluid.

16 Claims, 1 Drawing Figure

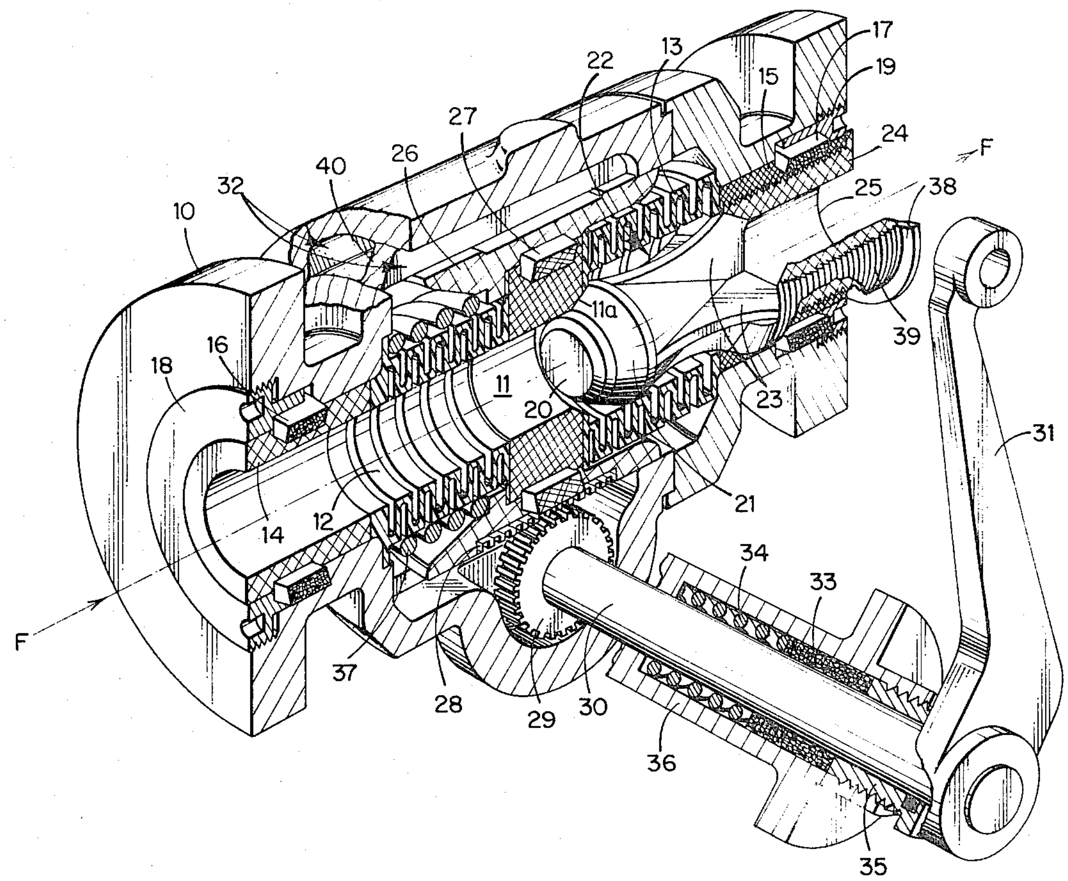
10
32
40
26
27
22
13
17
19
15
24
F
25
38
11a
11
20
23
39
31
18
16
14
12
21
34
33
F
37
28
29
30
36
35

VALVE

BACKGROUND OF THE INVENTION

This invention is directed to the problem of controlling or valving corrosive fluid media, or liquids or gases which, on contact with metals, form chemical compounds, or, in other words, cause destructive changes in their composition. In valves suited to corrosive fluid media, there are employed, for at least the inner or fluid exposed parts, inert material such as glass or porcelain; and it is also known to employ for at least part of the inner, medium-contacting parts, corrosion-proof plastics, such as polytetrafluoroethelyne (Teflon).

However, there remains with such known valves the problem of protecting the valve stem, or valve actuator, which has to be, usually for mechanical reasons, of metal construction. In the prior constructions, more particularly, the introduction of the valve stem into the interior of the valve has required costly packing arrangements, to assure that at no point may the corrosive medium come into contact with metal parts, or escape from the valve, such as is particularly critical where, as commonly, the fluid medium to be controlled or valved is under a pressure substantially exceeding atmospheric pressure.

Under this invention, the problem is solved by an improved construction and operation wherein the fluid-medium-exposed valve parts are fabricated of corrosion-proof materials, and wherein the valve actuator is sealed off from exposure to the corrosive fluid without resort to the costly packing arrangements heretofore required. The improved valve hereof is distinguishable also by great simplicity of mechanical design, freedom from trouble, and minimum sealing points. The invention valve thus enjoys as well excellent operating reliability, and widespread application.

BRIEF SUMMARY OF THE INVENTION

A valve particularly suited for use with corrosive fluids having a housing formed with a fluid passage, and provided therewithin with a valve plug and seat, and with complete passage liner parts, consisting of corrosion-proof material; and wherein also the sealing between said housing and the passage liner parts is at as few sealing points as possible. The valve plug, or flow passage closing or locking member or piece, is firmly connected with, or fixedly positioned within, the valve housing. The valve seat is a primarily ring-shaped member forming part of the valve flow passage, and mounted for shifting relative to said plug between flexible bellows members integrally connected at the ring sides, and further parts of the flow passage liner. Outwardly of said flexible or folded bellows the fluid passage liner comprises tubular end pieces or sleeves integrally joined or one-piece joined to said bellows at their sleeve inner ends, and which sleeves are at their outer ends firmly connected or sealed to said housing by simple packings. Whereas the mentioned fluid passage forming parts may be fabricated of metal, they preferably, under the invention, consist of corrosion-proof plastic, in particular, polytetrafluoroethylene, or polytetrafluoroethylene reinforced with embedded fillers.

By the reverse from the usual use under the invention of a fixed valve plug and moveable valve seat, the prior, moveable valve stem, requiring to be guided through the housing with packings, is dispensed with. Also eliminated by the one piece seat ring, bellows, and end sleeve construction, are all sealing points inside the valve; the only sealing points required are outside the flow passage between the two end pieces and the valve housing.

In the preferred embodiment hereof, for controlling the valve, or more particularly the moveable valve seat, there is provided a guide piece or sleeve externally connected or keyed to the valve seat, and provided with means whereby the guide sleeve and through it the valve seat may be positioned by an external actuator.

BRIEF DESCRIPTION OF THE DRAWINGS

In the accompanying drawing,

FIG. 1 is a perspective view of a preferred form of the invention valve, broken away to show the interior parts.

DESCRIPTION OF THE PREFERRED EMBODIMENT

A valve housing 10, which may be of a material selected for the purpose, for example, metal or plastic, has a central axial passage therethrough through which the corrosive fluid media flows in the left to right or inlet-to-outlet direction of the arrows F. An axially reciprocable valve seat ring 11 is positioned centrally within housing 10, and is endwise engaged to an inlet-side bellows-fold or flexible bellows 12, and an outlet-side bellows-fold or flexible bellows 13.

Attached to the outer ends of the bellows 12, 13 are rigid end pieces or sleeves 14, 15 press fitted into, or otherwise fixedly positioned within the ends of, valve housing 10. The ring 11, bellows 12, 13, and end sleeves 14, 15 are integrally or one-piece joined in known or preferred manner, and comprise an end-to-end fluid passage liner obviating all sealing points inside the valve, and which liner is sufficiently provided on its outside with packings 16, 17 recessed in the sleeves 14, 15 and endwise clamped to the housing 10 as by clamping rings 18, 19 threaded or otherwise removeably engaged there to, the said packings 16, 17 serving to connect the described liner member 11, 12, 13, 14, 15 to the valve housing 10.

The fixed valve plug 20, has a solid truncated cone nose portion whose contact surface 21 mates with correspondingly tapered seat face **11*a* at the outlet side of seat ring 11, and is arranged axially centrally within the flow passage whereby, when the valve is open, to pass the fluid therearound between it and the larger dimensioned bellows 13**.

Valve plug 20 has an intermediate passaged or fluted portion 22 defining the axial splines or ribs 23, and outwardly or downstream thereof, a cylindrical portion 24 having a central annular opening or passage 25 defining the valve flow passage thereat, and into which the fluid flows upon passing from the space around plug nose 21 and within larger inside-dimensioned bellows 13 through the passage, of intermediate plug portion 23.

The flow passage liner member, comprising the ring 11, bellows 12, 13, and end sleeves 14, 15, and together therewith the plug 20 which also is exposed to the corrosive media, consists of polytetrafluoroethylene (Teflon), with the bellows 12, 13, being flexible or elastic, consisting of pure Teflon, and the rigid seat ring 11, end sleeves 14 and 15, and valve plug 20 consisting of Teflon with filler materials, for example carbon, embedded therein, to strengthen the same.

Means are provided for controlling or axially reciprocating seat ring 11 to open and close the valve, comprising guide sleeve 26 received within housing 10 and surrounding seat ring 11, and being connected or keyed thereto by a split elastic ring 27 received within juxtaposed, channel-forming, annular recesses or grooves in the facing or inner and outer walls of said guide sleeve 26 and seat ring 11. The split ring 27 may be Teflon embedded with filler particles of high grade steel, to provide increased strength.

Guide sleeve 26 is provided on its outside with means, herein toothed rack 28, for its engagement and axial positioning by an external actuator, herein cogwheel 29 carried on or at the inner end of rotary shaft 30 projecting from the valve housing and mounting outwardly or at its other end the usual actuator link or lever 31 and sealed by packing 33 compressed between spring 34 and retaining ring 35 threaded behind packing 33 into shaft housing 36.

Means such as coil springs 37 are mounted outwardly of or around inlet bellows 12 and compressed by housing 10 and guide sleeve 26, as between stop shoulders thereon, normally to bias seat ring 11 towards or to close against valve plug 20. The coil spring or like means 37 for biasing the guide sleeve 26 and therethrough the seat ring 11 is not required to supply valve closing force, but rather is of advantage in taking up any dead travel as between rack 28 and cogwheel 29, and thereby, in thus compensating for or equalizing any variations in the driving member, or actuator train, preventing manifestations of hysteresis on valve adjustment.

Valve plug 20 is firmly connected to the housing, or more particularly fixed in outlet end sleeve 15, in desired or convenient manner, as herein by interfitting threads 39 thereon, and may be limit-stopped therein as by integral or other end flange 38 or the like overlying said sleeve 15.

Housing 10 may be provided in its central enlarged region surrounding the guide sleeve 26 and bellows 12, 13 and intermediate the outer housing portions to which are sealed the end sleeves 14, 15, with a series of hollow spaces or radial-axial passages as defined by the intervening ribs 40, in to which may be charged, in known manner, one or another fluid, whether gas or liquid, as may be desired or preferred, and which may be conditioned for special purposes such as either cooling or heating of the valve, the said fluid being sealed against escape by the aforementioned packing 33 about shaft 30 and within shaft housing 36.

The fashioning of inlet bellows 12 as smaller in its inside diameter than outlet bellows 13, and in inside line with inlet end sleeve 14 and the seat ring 11 as the flow passage liner thereat, made possible a particularly favorable and space-saving dimensioning of the inner parts of the valve.

With spring 37 biasing in the downstream or valve closing direction, and in combination with the action of the fluid flow in the arrow direction F, the valve is a self-closing one, or one requiring almost no closing forces, or that closes itself if the link or lever 31, or other actuator, is removed, or disregarded.

The opening or closing of the valve is effected through rotation of the actuating lever 31, whose movement is transmitted through shaft 30, cogwheel 29, rack 28, guide sleeve 26, and split ring 27, to seat ring 11, whose surface 11a lifts from the contact surface 21 of valve plug, or touches down on said valve plug surface 21, according as actuator 31 is rotated to the left of or counterclockwise from, or to the right or clockwise to, the FIG. 1 or closed position.

With the valve in the open position, or with actuator 31 counter-rotated to the left of its FIG. 1 position, so as to lift seat ring 11 from its FIG. 1 engagement against plug face 21, the fluid medium flows in arrow direction F from within sleeve 14, bellows 12 and ring 11, around plug 20 and within larger bellows 13, through the openings of plug passaged portion 22, to the interior or passage 25 of plug outlet portion 24, from whence it emerges from the valve. In this the fluid flow over plug face 21 and within bellows 13 continues through the passages of the plug portion 22, that complete the plug nose cone by sloping inwardly as shown from said contact surface 21 to the central plug outlet passage 25.

We claim:

1. A valve particularly for metal attacking fluid media, comprising, in combination, a valve housing having a through flow passage extending from its inlet to its outlet ends;

a valve seat ring received centrally within said housing, said seat ring arranged for shifting axially of said flow passage between valve opening and closing positions, said valve seat ring having generally radial end faces and a tapered seat face intermediate its said generally radial end faces;

means forming with said seat ring a liner for said flow passage extending the full fluid-medium-exposed length of said valve housing between its said inlet and outlet ends, said liner comprising annular bellows, said annular bellows engaging said generally radial end faces of said seat ring at their inner ends;

means provided by said valve housing for supporting said annular bellows at their respective outer ends, said annular bellows engaged at their said outer ends to liner-forming portions of said housing provided means, and whereby said bellows extend continuously, in said liner, with said housing provided supporting means and with said seat ring, said bellows arranged thereby for their reciprocal axial extending and contracting to afford said seat ring said axial shifting between its said valve opening and valve closing positions;

a valve plug fixed in said housing at the outlet side of said seat ring, said valve plug having a solid portion engageable by said seat ring upon its axial shifting thereagainst to close said flow passage, and said valve plug having a passaged portion at the outlet side of its solid portion, said passaged portion permitting fluid flow therethrough to said outlet end of said valve housing upon the axial shifting of said seat ring to disengagement from said solid portion of said valve plug; and means engageable by a valve actuator for controlling the axial shifting of said seat ring between said valve closing and opening positions of engagement against and disengagement from said valve plug solid portion, said controlling means shifting said seat ring from without said flow passage of said valve housing.

2. A valve according to claim 1, wherein the flow-passage-exposed parts are of corrosion-proof plastic construction.

3. A valve according to claim 1,
wherein the flow-passage-exposed parts are constructed of Teflon.

4. A valve according to claim 1, wherein said housing provided, bellows outer end supporting means comprise
rigid sleeves received in said housing at its said inlet and outlet ends and joined to said bellows at their said outer ends, said sleeves defining end-to-end, with said bellows and seat ring, the walls of said flow passage through said housing.

5. A valve according to claim 4,
wherein said sleeves comprise a corrosion-proof plastic having strengthening metal filler particles embedded therein.

6. A valve according to claim 5,
wherein the plastic is Teflon and the metal filler is carbon.

7. A valve according to claim 4, and
packings sealing between said rigid sleeves and said housing.

8. A valve according to claim 7, wherein said packings are engaged to said sleeves, and
retainers releasably engaged to the ends of said housing and endwise clamping said packings.

9. A valve according to claim 8, wherein said packings are recessed in said sleeves and compressed also between said retainers and said housing ends.

10. A valve according to claim 4, wherein said valve plug is threaded into said outlet end sleeve, and
a flange on said valve plug and overlying said sleeve to limit-stop the screwing of said valve plug into said outlet end sleeve.

11. A valve according to claim 1, and
spring means received in said housing and arranged about said bellows at the inlet side of said seat ring, said spring means axially engaged between said seat ring and said housing normally to bias said seat ring to closing engagement against said valve plug.

12. A valve according to claim 1, wherein the material of said valve plug comprises Teflon impregnated with carbon particles.

13. A valve according to claim 1, wherein said seat ring controlling means comprises
a guide sleeve received and sliding in said housing about said seat ring,
means axially keying said guide sleeve to said seat ring, and
means adapting said guide sleeve for engagement and shifting by an actuator.

14. A valve according to claim 13, wherein said axially keying means comprise
a split elastic ring received in juxtaposed annular recesses in the inner and outer walls respectively of said guide sleeve and seat ring.

15. A valve according to claim 13, and
a drive shaft extending without said housing; and
an actuator lever on said shaft; and wherein said guide sleeve adapting means comprise
means for translating rotary motion of said drive shaft to reciprocating motion of said guide sleeve.

16. A valve according to claim 15, wherein said translating means comprise
a rack on said guide sleeve, and
a cogwheel on said shaft and engaging said rack.

* * * * *